United States Patent [19]

Muller et al.

[11] Patent Number: 5,490,021
[45] Date of Patent: Feb. 6, 1996

[54] SUPPORT DEVICE WITH A UNIFORMLY SEALING LOCKING-PIECE, AND DATA STORAGE UNIT PROVIDED WITH SUCH A SUPPORT DEVICE

[75] Inventors: Johannes C. A. Muller; Robert C. H. Boereboom; Jelm Franse, all of Eindhoven, Netherlands

[73] Assignee: U.S. Philips Corporation, New York, N.Y.

[21] Appl. No.: 223,473

[22] Filed: Apr. 5, 1994

[30] Foreign Application Priority Data

Sep. 2, 1993 [BE] Belgium ................. 09300897

[51] Int. Cl.$^6$ ............... H02K 7/08; G11B 17/08; F16C 33/74
[52] U.S. Cl. ............... 360/98.07; 360/99.08; 310/67 R; 310/90; 384/152
[58] Field of Search ............... 360/97.01, 98.01, 360/98.07, 98.08, 99.04, 99.08, 99.12; 310/67 R, 90, 90.5, 49, 124, 151–153, 607; 384/107

[56] References Cited

U.S. PATENT DOCUMENTS

| | | | |
|---|---|---|---|
| 4,555,188 | 11/1985 | Neal | 384/482 |
| 4,596,475 | 6/1986 | Pannwitz | 384/147 |
| 4,710,150 | 12/1987 | Margiavacchi | 464/14 |
| 4,768,888 | 9/1988 | McNaull | 384/129 |
| 4,822,182 | 4/1989 | Matsushita et al. | 384/107 |
| 4,836,694 | 6/1989 | Schmehr et al. | 384/151 |
| 4,896,239 | 1/1990 | Ghose | 360/106 |
| 4,934,781 | 6/1990 | Kato et al. | 310/90.5 |
| 5,012,359 | 4/1991 | Kohno et al. | 360/98.07 |
| 5,142,173 | 8/1992 | Konno et al. | 310/67 R |
| 5,213,343 | 5/1993 | White, Jr. | 384/607 |
| 5,227,686 | 7/1993 | Ogawa | 310/90 |

FOREIGN PATENT DOCUMENTS

| | | |
|---|---|---|
| 2187047 | 1/1974 | France . |
| 1222275 | 2/1991 | United Kingdom . |

*Primary Examiner*—Stuart S. Levy
*Assistant Examiner*—Jefferson Evans
*Attorney, Agent, or Firm*—Brian J. Wieghaus

[57] ABSTRACT

A support device (1) with a first bearing part (33) and a second bearing part (51). The first bearing part (33) is in a housing (11), while the second bearing part (51) is provided on a locking piece (53) fastened to the housing (11). Leakage along the locking piece (53) of a fluid present between the bearing parts (33, 51) is prevented by the use of a sealing element (59). The sealing element (59) is provided under pretension between the locking piece (53) and a pressure member (61, 87) fastened to the housing (11), the locking piece (53) bearing on the housing (11) under the influence of the pretension of the sealing element (59). Since the locking piece (53) bears on the housing (11) under the influence of the pretension of the sealing element (59), the locking piece (53) is fixed in an accurate position relative to the housing (11). An accurately defined mutual position of the first and the second bearing part (33, 51) is achieved in this manner.

18 Claims, 5 Drawing Sheets

SUPPORT DEVICE WITH A UNIFORMLY SEALING LOCKING-PIECE, AND DATA STORAGE UNIT PROVIDED WITH SUCH A SUPPORT DEVICE

BACKGROUND OF THE INVENTION

The invention relates to a support device with a bearing which is surrounded by a housing and which is provided with a first bearing part present inside the housing and with a second bearing part provided on a locking piece fastened to the housing so as to cooperate with said first bearing part, while the support device comprises an elastically deformable sealing element for preventing leakage of a fluid present between the two bearing parts along the locking piece.

The invention also relates to a data storage unit for accommodating an information disc, which unit is provided with a scanning unit for cooperating with the information disc and with a support device according to the invention for the rotary support of the information disc.

A support device of the kind mentioned in the opening paragraph is shown in FIG. 3 of British Patent 1 222 275. The known support device comprises a shaft which is rotatably supported in the housing by means of a radial dynamic groove bearing and an axial dynamic groove bearing. The first bearing part mentioned in the opening paragraph belongs to the axial groove bearing and comprises a bearing surface 13 which extends perpendicularly to the shaft, which is present on a flange 3, and which is provided with a pattern of grooves. The second bearing part also belongs to the axial groove bearing and comprises a bearing surface 14 which extends perpendicularly to the shaft, and which forms an inner wall of the locking piece with which the bearing space 5 present in the housing is closed off. A liquid lubricant is present between the bearing surfaces 13 and 14. To prevent leakage of the liquid lubricant along the locking piece, the known support device may be provided with a conventional sealing element which is known per se such as, for example, a sealing ring, which is not shown in the Patent and which is clamped in under pretension between the housing and the locking piece when the locking piece is provided on the housing. The known support device is further provided with grooves 12 against leakage of the liquid lubricant along the shaft 2.

A disadvantage of the use of such a sealing element in the known support device is that the positional accuracy of the locking piece relative to the housing is adversely affected by the pretension of the sealing element. The pretension of the sealing element may give rise to deformations of the fastening means by which the locking piece is fastened to the housing during or after fastening of the locking piece to the housing. Said deformations lead to small, undesirable displacements of the locking piece relative to the housing, whereby the position of the first bearing part relative to the second bearing part and the operation of the bearing are adversely affected.

SUMMARY OF THE INVENTION

It is an object of the invention to provide a support device of the kind mentioned in the opening paragraph with which the above disadvantage is avoided.

The invention is for this purpose characterized in that the sealing element is provided under pretension between the locking piece comprising said second bearing part and a pressure member fastened to the housing, the locking piece bearing on the housing under the influence of the pretension of the sealing element. Since the locking piece bears on the housing under the influence of the pretension of the sealing element, which is present between the locking piece and a pressure member fastened to the housing, the locking piece is fixed in an accurate position relative to the housing. Deformations of the fastening means of the pressure member, which may arise as a result of the pretension of the sealing element, lead to small displacements of the pressure member relative to the housing, but not to undesirable displacements of the locking piece relative to the housing.

A special embodiment of a support device according to the invention is characterized in that the locking piece bears on a seat of the housing by means of an adapter, while the sealing element bears on the adapter and the second bearing part is situated at a distance from the sealing element, the adapter, and the seat. Since the second bearing part provided on the locking piece is at a distance from the sealing element, the adapter and the seat, the second bearing surface remains substantially free from mechanical stresses which occur in and adjacent a force transmission path formed by the sealing element, the adapter, and the seat. Deformations of the second bearing surface, which adversely affect the bearing operation, are prevented thereby.

A further embodiment of a support device according to the invention is characterized in that the first bearing part is provided on a shaft which is rotatably supported relative to the housing by means of the bearing, while the locking piece and the shaft are concentrically arranged relative to an axis of rotation of the shaft, the adapter being an annular disc which extends along a circumference of the locking piece, while the sealing element and the pressure member are annular in shape and concentrically surround the locking piece. The use of the annular locking piece, the annular sealing element, and the annular pressure member provides a uniform fastening of the locking piece to the housing which is readily mounted.

A yet further embodiment of a support device according to the invention is characterized in that the bearing is an axial dynamic groove bearing in which the first bearing part is an annular bearing disc which is fastened around the shaft and is provided with an annular bearing surface extending perpendicularly to the axis of rotation and having a pattern of grooves, while the second bearing part is an annular bearing disc which is fastened to the locking piece and is provided with a bearing surface extending perpendicularly to the axis of rotation so as to cooperate with the bearing surface of the first bearing part. The use of the two annular bearing discs leads to a uniform support of the shaft in axial direction, while axial bearing forces are uniformly transmitted to the pressure member.

A further embodiment of a support device according to the invention is characterized in that the pressure member is fastened to the housing by means of a flanged rim. The use of the flanged rim provides a uniform and easily realised fastening of the pressure member to the housing.

A particular embodiment of a support device according to the invention is characterized in that the sealing element bears on an annular first contact surface which is provided on the adapter and extends perpendicularly to the axis of rotation, on a circular-cylindrical second contact surface which is provided near the seat on the housing and is concentric with the axis of rotation, and on a third contact surface which is provided on the pressure member and extends conically relative to the axis of rotation. The use of the conical contact surface of the pressure member provides a uniform pressure distribution of the sealing element over the first and second contact surface, so that leakage of the fluid present in the housing along the first or second contact surface is substantially excluded.

A further embodiment of a support device according to the invention is characterized in that the second contact surface merges into the first contact surface near the seat via a curvature. The use of the curvature between the second and the first contact surface eliminates the presence of a detrimental volume between the sealing element and the first and second contact surface, in which undesirable fluid may be present.

A special embodiment of a support device according to the invention is characterized in that the sealing element bears on an annular first contact surface provided on the adapter and extending perpendicularly to the axis of rotation, on an annular second contact surface provided on the housing near the seat and extending perpendicularly to the axis of rotation, and on an annular third contact surface provided on the pressure member and extending perpendicularly to the axis of rotation, the contact surfaces of the adapter and of the housing merging into one another. The use of the mutually merging contact surfaces again prevents a detrimental volume being present between the sealing element and the first and second contact surfaces, where undesirable fluid could be present. The use of the first contact surface, the second contact surface merging there into, and the third contact surface extending parallel to the first and second contact surfaces achieves that the fastening of the pressure member is possible without slipping of the housing along the sealing element, so that damage to the sealing element is substantially excluded.

A further embodiment of a support device according to the invention is characterized in that the pressure member is an elastically deformable annular disc which is provided near a circumference with the third contact surface which bears on the sealing element under the influence of a closing ring fastened to the housing under elastic deformation of the pressure member, which pressure member bears with a support ridge on the locking piece under the influence of a pretension of the pressure member derived from said elastic deformation. The pretension of the sealing element may decrease owing to ageing of the sealing element, and the compression force with which the locking piece bears on the housing may become insufficient. The use of the support ridge which bears on the locking piece under the influence of the pretension of the elastic pressure member maintains a predetermined compression force in the case of ageing of the sealing element.

A particular embodiment of a support device according to the invention is characterized in that the sealing element bears on an annular first contact surface provided on the adapter and extending perpendicularly to the axis of rotation, on a second contact surface provided near the seat on the housing and extending conically relative to the axis of rotation, and on a third contact surface provided on the pressure member and extending conically relative to the axis of rotation, the second contact surface merging into the first contact surface near the seat via a curvature, while the second and the third contact surface enclose an angle of substantially 60° seen in a plane through the axis of rotation. Owing to the use of the three said contact surfaces, the sealing element has three countercontact surfaces bearing on said contact surfaces and mutually arranged in an equilateral triangle. A uniform load on the sealing element and a particularly good sealing action of the sealing element are obtained in this manner.

A data storage unit with an information disc and a scanning unit for cooperating with the information disc, which is rotatably supported in a housing by means of a support device according to the invention, is characterized in that the shaft of the support device is fixed relative to the housing, while the information disc is coupled to the housing of the support device.

BRIEF DESCRIPTION OF THE DRAWING

The invention will be explained in more detail below with reference to the drawing, in which.

DETAILED DESCRIPTION OF THE PREFERRED EMBODIMENTS

Figure 1:
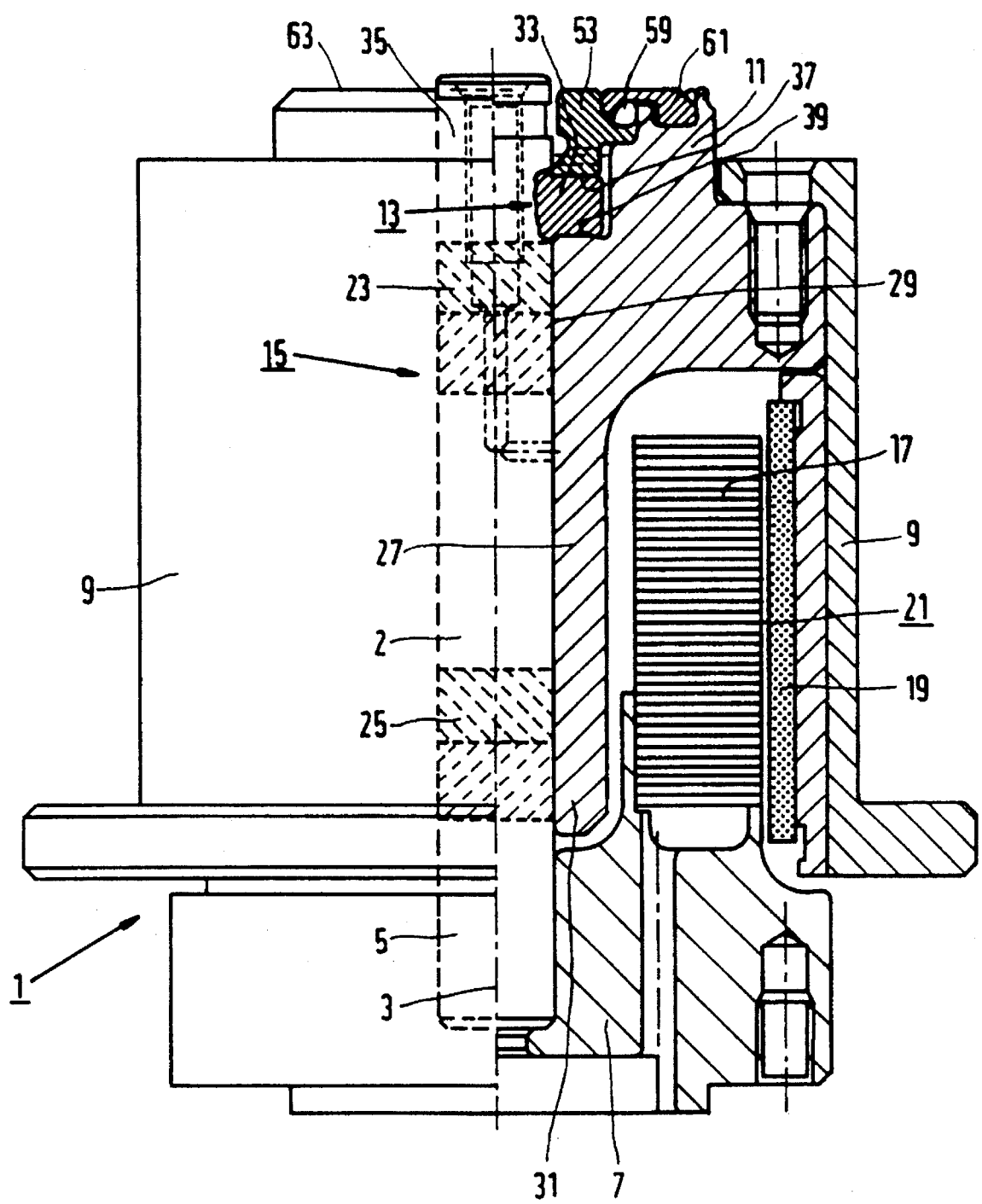
FIG. 1 shows a first embodiment of a support device according to the invention.

In FIGS. 1 to 8, similar components of the five embodiments shown have been given corresponding reference numerals.

Figure 2:
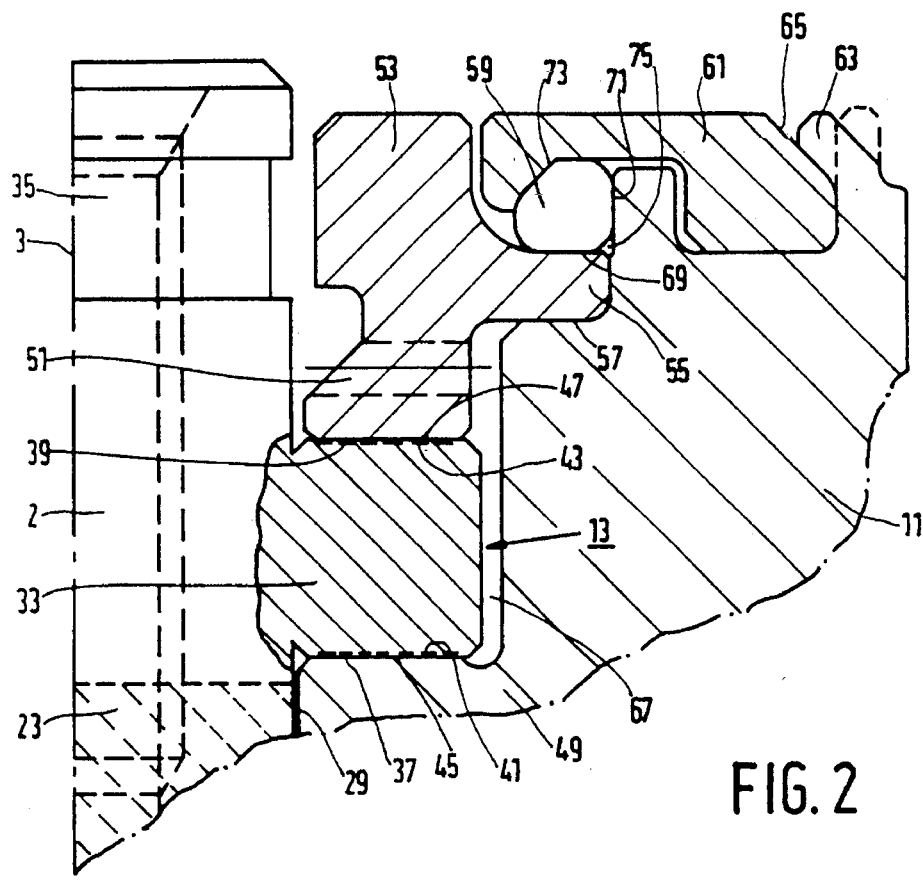
FIG. 2 shows in detail a locking-piece fastening of the support device according to FIG. 1.
Figure 3:
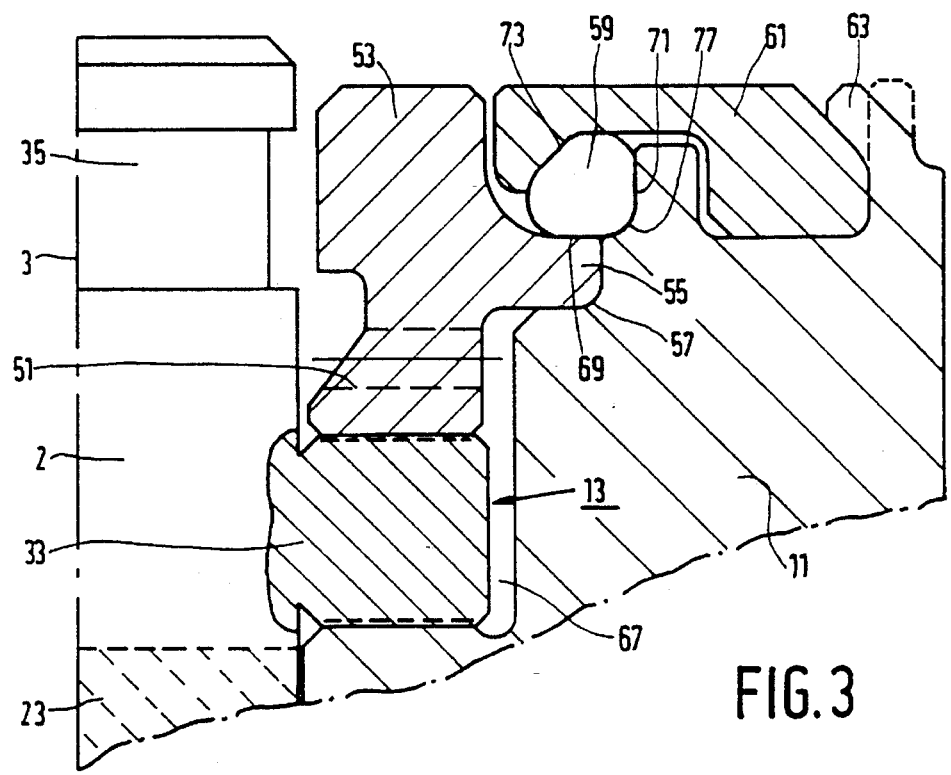
FIG. 3 shows in detail a locking-piece fastening of a second embodiment of a support device according to the invention.

The first embodiment of a support device 1 according to the invention shown in FIGS. 1 and 2 comprises a metal shaft 2 with a centreline 3. A first end 5 of the shaft 2 is fastened to a base 7. The support device 1 further comprises a carder 9 which is fastened to a housing 11 and which is rotatable along with the housing 11 about the shaft 2. The carrier 9 is supported by an axial dynamic groove bearing 13 in a direction parallel to the shaft 2 and by a radial dynamic groove bearing 15 in a direction perpendicular to the shaft 2. An electric coil system 17, pictured diagrammatically only in FIG. 1, is fastened to the base 7, while a system of permanent magnets 19 is fastened to the carder 9. The electric coil system 17 and the permanent magnets 19 belong to an electric drive motor 21 by which the carrier 9 and the housing 11 can be rotated about the shaft 2.

The radial dynamic groove bearing 15 is provided with two spiralling groove patterns 23 and 25 which are provided on the shaft 2 at a distance from one another in axial direction. Furthermore, the radial dynamic groove bearing 15 comprises a metal cylinder 27 which belongs to the housing 11 and which has two smooth circular-cylindrical wall portions 29 and 31 which surround the groove patterns 23 and 25, respectively, with a slight clearance. A fluid is present between the groove patterns 23, 25 and the wall portions 29, 31, such as, for example lubrication oil or grease. A pressure rise of the fluid present in the groove patterns 23 and 25 is generated by a rotation of the cylinder 27 about the shaft 2, so that the shaft 2 exerts a radial supporting force on the cylinder 27 and the carder 9.

As is shown in FIG. 2, the axial dynamic groove bearing 13 comprises an annular bearing disc 33 which is present around the shaft 2 adjacent a second end 35 of the shaft 2 and is manufactured integrally with the shaft 2. The bearing disc 33 is provided at both sides with annular bearing surfaces 37 and 39 which extend perpendicularly to the centreline 3 and which are provided with respective spiralling groove patterns 41 and 43. The groove patterns 41 and 43 are visible in FIG. 2 in side elevation only. The bearing disc 33 is arranged with slight clearance between two annular, smooth beating surfaces 45 and 47 which extend perpendicularly to the centreline 3. The bearing surface 45 is provided on a shoulder 49 present in the cylinder 27 so as to cooperate with the bearing surface 37, while the bearing surface 47 is provided on an annular bearing disc 51 so as to cooperate with the bearing surface 39. The bearing disc 51 belongs to an annular locking piece 53 which is fastened to the housing 11 and which concentrically surrounds the second end 35 of the shaft 2. A fluid is also present between the bearing surfaces 37 and 45 and the bearing surfaces 39 and 47. Under the influence of a rotation of the housing 11 about the shaft 2, a pressure rise is created in the fluid present in the groove patterns 41 and 43, so that the bearing disc 33 fastened to the shaft 2 exerts an axial supporting force on the housing 11 and the carrier 9.

During mounting of the support device 1, the shaft 2 with the beating disc 33 is inserted into the cylinder 27 and subsequently the locking piece 53 is fastened to the housing 11 in a manner to be described further below. Since the locking piece 53 comprises the bearing disc 51, and since the beating surfaces 37 and 39 provided on the bearing disc 33, the bearing surface 45 provided on the shoulder 49 and the bearing surface 47 provided on the bearing disc 51 must be located in accurate mutual positions for a good operation of the axial dynamic groove bearing 13, the locking piece 53 must be fastened in an accurate position relative to the housing 11. The locking piece 53 is for this purpose provided with an annular adapter 55 which extends along a circumference of the locking piece 53 and bears without play on a seat 57 provided in the housing 11 and mating with the adapter 55. The locking piece 53 bears on the seat 57 under the influence of an elastic pretension of an annular, elastically deformable sealing element 59 which is provided between the adapter 55 of the locking piece 53 and an annular pressure member 61 fastened to the housing 11, the sealing element 59 and the pressure member 61 concentrically surrounding the shaft 2 and the locking piece 53. The locking piece 53 is thus kept in the seat 57 by the pretension of the sealing element 59 and fixed in an accurate position relative to the housing 11.

The pretension of the sealing element 59 is maintained by the pressure member 61, a compression force exerted by the pressure member 61 on the sealing element 59 being transmitted through the sealing element 59 and the adapter 55 of the locking piece 53 to the seat 57. As is shown in FIG. 2, the adapter 55 and the sealing element 59 have an average diameter which is greater than an average diameter of the bearing disc 51 which belongs to the locking piece 53. The bearing disc 51 is thus at a distance from a force transmission path formed by the adapter 55, the sealing element 59 and the pressure member 61 for the compression force exerted by the pressure member 61. It is achieved in this way that the bearing disc 51 and the bearing surface 47 present on the beating disc 51 are not subject to mechanical stresses associated with the compression force which could lead to deformation of the beating surface 47 and adversely affect the operation of the axial dynamic groove bearing 13.

Since the bearing discs 33 and 51 are annular and surround the shaft 2 concentrically, the carrier 9 and the housing 11 are uniformly supported by the axial dynamic groove bearing 13 seen in circumferential direction during operation. Since also the locking piece 53, the adapter 55, the sealing element 59 and the pressure member 61 are annular and concentrically surround the shaft 2, an axial supporting force exerted by the shaft 2 on the housing 11 is transmitted to the housing 11 in a uniform manner, seen in circumferential direction, through the locking piece 53, the sealing element 59 and the pressure member 61.

As FIG. 2 shows, the pressure member 61 is fastened to the housing 11 by means of a flanged rim 63 which is bent around a bevelled circumference 65 of the pressure member 61. The said compression force exerted by the pressure member 61 on the sealing element 59 is transmitted to the pressure member 61 through the flanged rim 63 in a uniform manner seen in circumferential direction. The flanged rim 63 can be readily provided during mounting of the support device 1 by means of bending. It is noted that the flanged rim 63 springs back over a short distance under the influence of the pretension of the sealing element 59 after flanging, so that the pressure member 61 is displaced over a small distance relative to the housing 11 and the pretension of the sealing element 59 is slightly reduced. This, however, does not affect the accurate position of the locking piece 53 in the seat 57 of the housing 11 under the influence of the remaining pretension of the sealing element 59.

The fluid present between the bearing surfaces 37 and 39 and the bearing surfaces 45 and 47 of the axial dynamic groove bearing 13 is subject to a centrifugal force owing to the rotation of the housing 11 around the shaft 2 during operation. To prevent the fluid present between the bearing surfaces 37 and 39 and the bearing surfaces 45 and 47 being driven away under the influence of said centrifugal force, an annular channel 67 also filled with the fluid is present between the housing 11 and the bearing discs 33 and 51. The pressure of the fluid present in the channel 67 is higher, owing to said centrifugal force, than an ambient pressure prevalent around the support device 1, the sealing element 59 provided under pretension between the locking piece 53 and the pressure member 61 preventing leakage of the fluid present in the channel 67 along the seat 57 and the adapter 55.

As is shown in FIG. 2 for the first embodiment of the support device 1, the annular sealing element 59 bears on an annular first contact surface 69 provided on the adapter 55 of the locking piece 53 and extending perpendicularly to the centreline 3, on a circular-cylindrical second contact surface 71 provided near the seat 57 on the housing 11 and arranged concentrically relative to the centreline 3, and on a third contact surface 73 provided on the pressure member 61 and extending conically relative to the centreline 3. Owing to the use of the conical contact surface 73, the sealing element 59 bears under pretension not only on the first contact surface 69, but also on the second contact surface 71. In this manner the compression force exerted by the pressure member 61 is uniformly distributed over the first and second contact surfaces 69, 71, so that leakage of the fluid present in the channel 67 along both the first contact surface 69 and the second contact surface 71 is substantially eliminated.

In the first embodiment of the support device 1 shown in FIG. 2, the first and the second contact surface 69, 71 and the sealing element 59 enclose a detrimental volume 75 near the seat 57 in which a quantity of fluid is present during operation under the influence of the fluid pressure in the channel 67. Owing to the detrimental volume 75, whose size is influenced by the value of the compression force of the pressure member 61, the quantity of fluid required for the axial dynamic groove bearing 13 cannot be accurately dosed. In the second embodiment of the support device 1 shown in FIG. 3, which is identical to the first embodiment of the support device 1 in its main features, said detrimental volume is avoided in that the second, circular-cylindrical contact surface 71 is provided with a curvature 77 near the seat 57, through which curvature the second contact surface 71 merges into the first contact surface 69.

Figure 4:
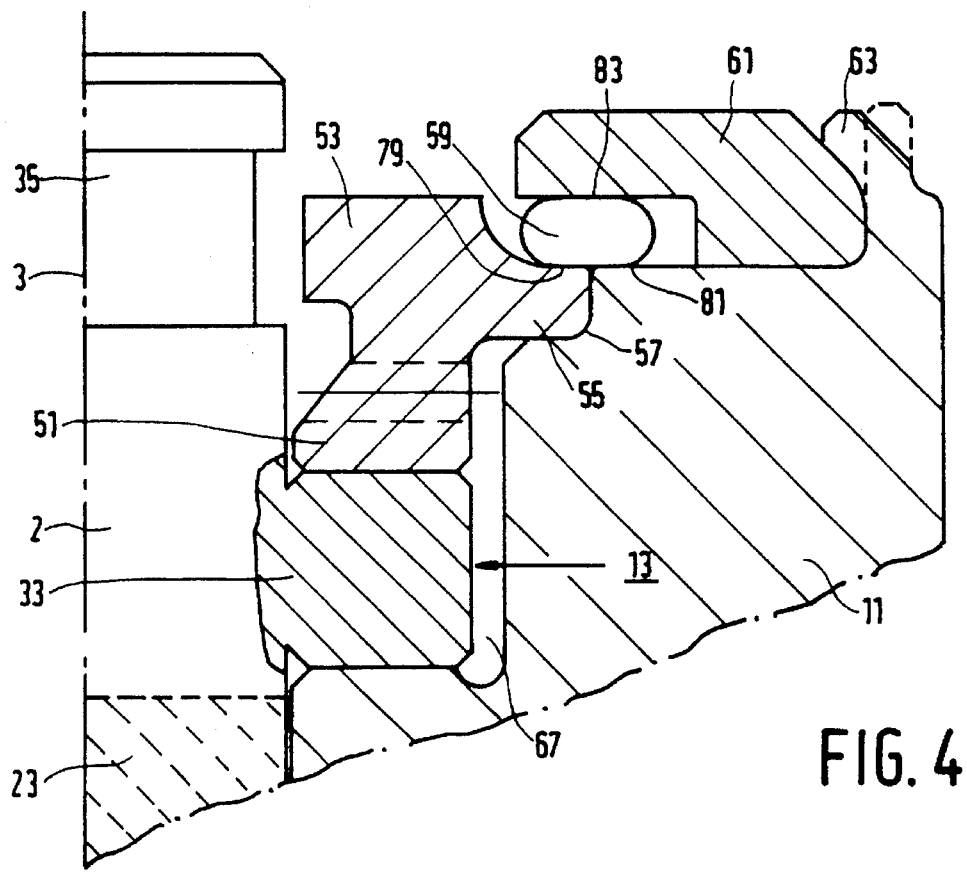
FIG. 4 shows in detail a locking-piece fastening of a third embodiment of a support device according to the invention.

The third embodiment of the support device 1 shown in FIG. 4 is also identical to the first embodiment of the support device 1 as regards its main features. In the third embodiment, the sealing element 59 bears on an annular first contact surface 79 provided on the adapter 55 of the locking piece 53 and extending perpendicularly to the centreline 3, on an annular second contact surface 81 provided near the seat 57 on the housing 11 and also extending perpendicularly to the centreline 3, and on an annular third contact surface 83 provided on the pressure member 61. As FIG. 4 shows, the first contact surface 79 and the second contact surface 81 lie flush and the third contact surface 83 extends parallel to the first and second contact surfaces 79, 81. As in the second embodiment of the support device 1, again no detrimental volume is present between the first and the second contact surface 79, 81 and the sealing element 59 in the third embodiment of the support device 1. In the third embodiment, the sealing element 59 has a countercontact surface with the third contact surface 83 situated substantially diametrically opposite a countercontact surface with the first contact surface 79 and a countercontact surface with the second contact surface 81. During fastening of the pressure member 61 on the housing 11 and pretensioning of the sealing element 59, therefore, substantially no slipping will take place between the sealing element 59 and the contact surfaces 79, 81 and 83, and between the sealing element 59 and the housing 11, so that damage to the sealing element 59 owing to slipping is prevented.

Figure 5:
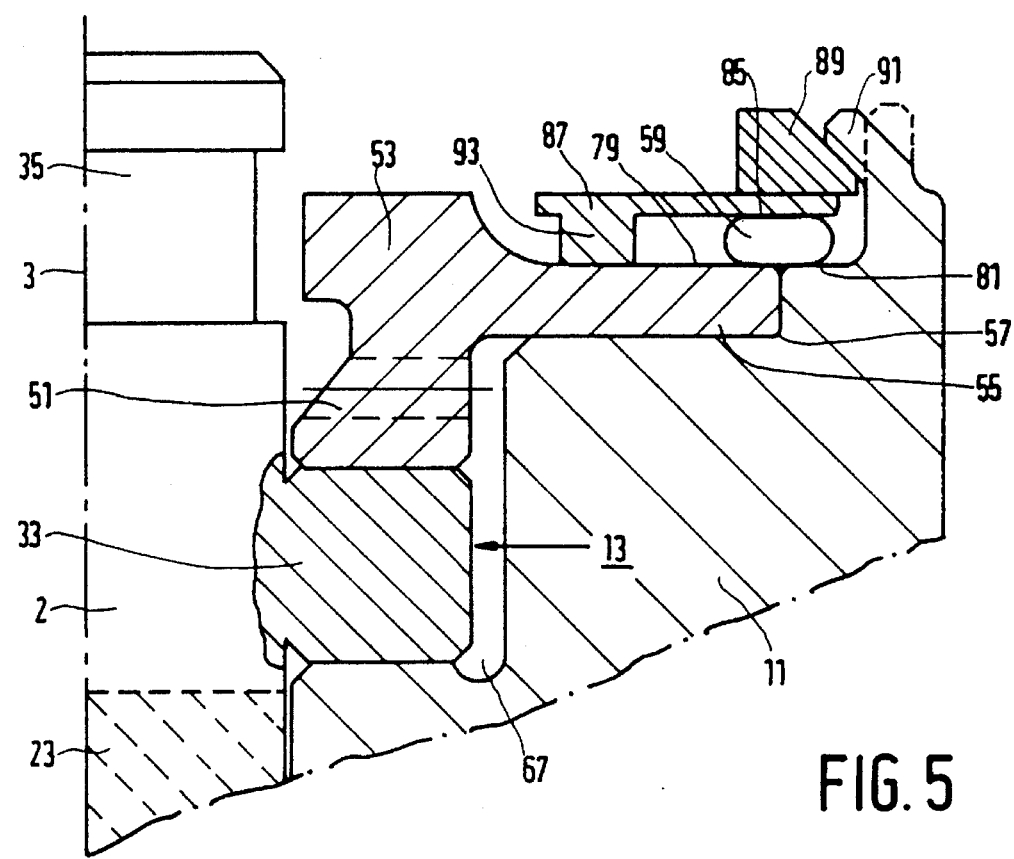
FIG. 5 shows in detail a locking-piece fastening of a fourth embodiment of a support device according to the invention.

In the fourth embodiment of the support device 1 shown in FIG. 5, the sealing element 59 bears on two mutually flush contact surfaces 79 and 81, as is the case in the third embodiment shown in FIG. 4, which surfaces extend perpendicularly to the centreline 3 and are provided on the adapter 55 and the housing 11, respectively, and on an annular third contact surface 85 of a pressure member 87, which third contact surface extends parallel to the contact surfaces 79 and 81. The pressure member 87 is an elastically deformable annular disc, the third contact surface 85 extending near a circumference of the pressure member 87. The third contact surface 85 bears on the sealing element 59 under the influence of a compression force exerted on the pressure member 87 by a closing ring 89 which is fastened to the housing 11 by means of a flanged rim 91. The pressure member 87 further comprises an annular support ridge 93 by which the pressure member 87 bears on the adapter 55 of the locking piece 53 under the influence of an elastic pretension which is present in the pressure member 87 as a result of an elastic deformation of the pressure member 87 caused by the compression force of the closing ring 89. When the pretension of the sealing element 59 decreases owing to, for example, ageing of the elastic material of the sealing element 59, the compression force exerted by the pressure member 87 on the locking piece 53 via the support ridge 93 is not or substantially not affected, so that the locking piece 53 remains in an accurate position relative to the housing 11.

Figure 6:
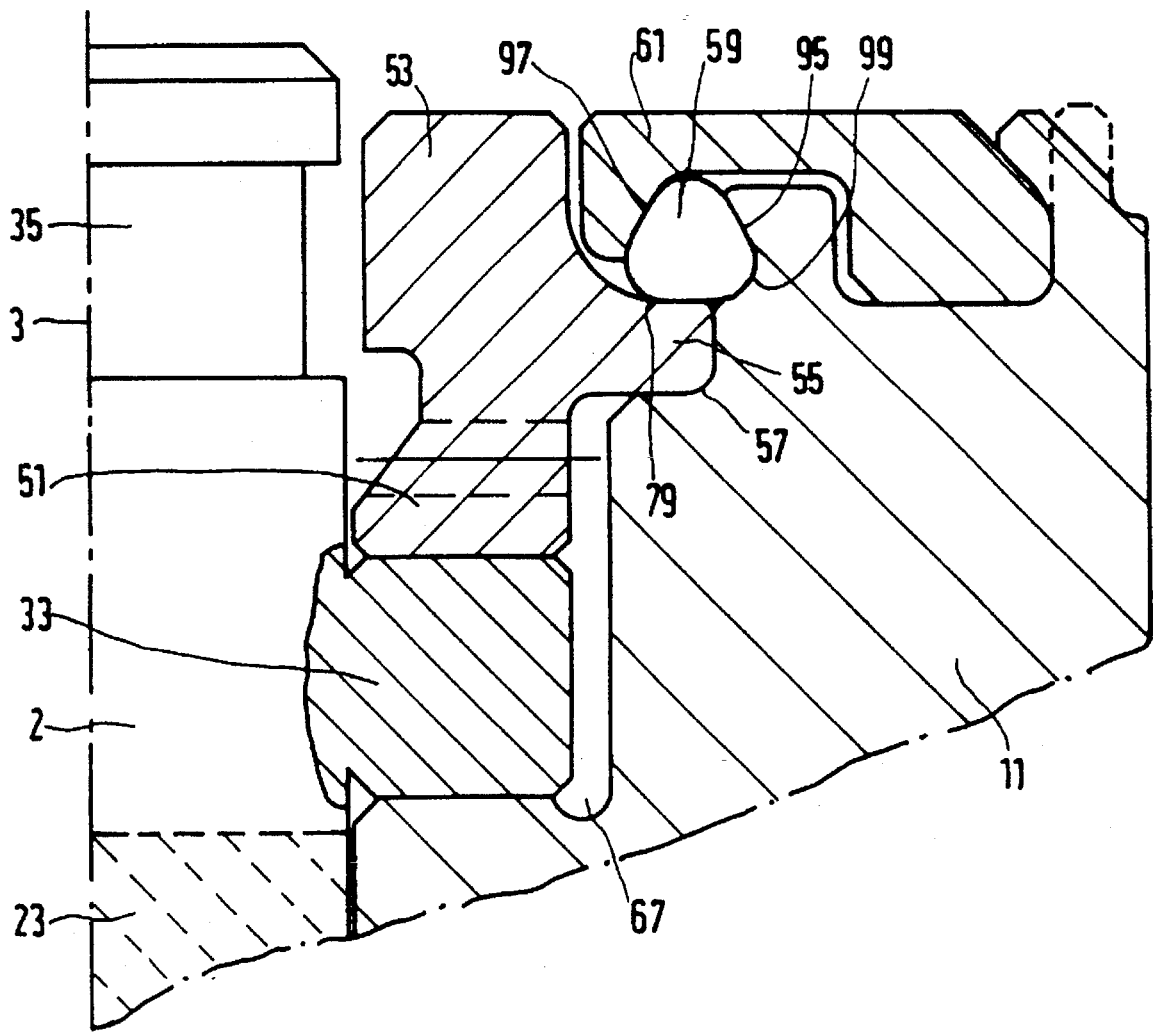
FIG. 6 shows in detail a locking-piece fastening of a fifth embodiment of a support device according to the invention.

In the fifth embodiment of the support device 1 shown in FIG. 6, which is again identical to the first embodiment of the support device 1 as regards its main features, the sealing element 59 again bears on an annular first contact surface 79 provided on the adapter 55 of the locking piece 53 and extending perpendicularly to the centreline 3. The sealing element 59 further bears on a second contact surface 95 which is provided near the seat 57 in the housing 11 and which extends conically relative to the centreline 3, and on a third contact surface 97 provided on the pressure member 61 and also extending conically relative to the centreline 3. As FIG. 6 shows, the second contact surface 95 merges into the first contact surface 79 via a curvature 99. The second contact surface 95 and the third contact surface 97 enclose an acute angle of approximately 60° seen in a plane through the centreline 3. The sealing element 59 provided between the adapter 55 and the pressure member 61 is thus in contact with the three contact surfaces 79, 95 and 97 by means of three countercontact surfaces mutually arranged in an equilateral triangle seen in said plane through the centreline 3. A uniform distribution of the pretension of the sealing element 59 over the first, second and third contact surfaces 79, 95, 97 is achieved in this manner, as well as a particularly satisfactory sealing action of the sealing element 59.

Figure 7:
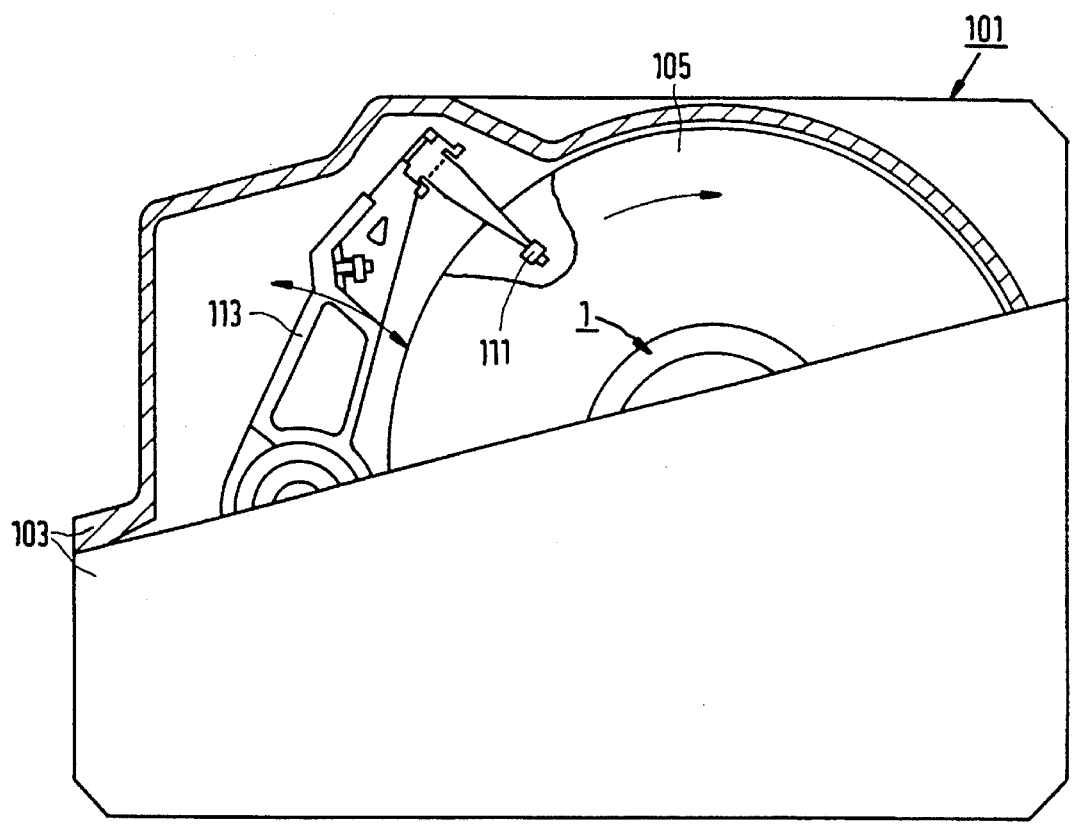
FIG. 7 is a diagrammatic plan view of a data storage unit provided with a support device according to the invention.
Figure 8:
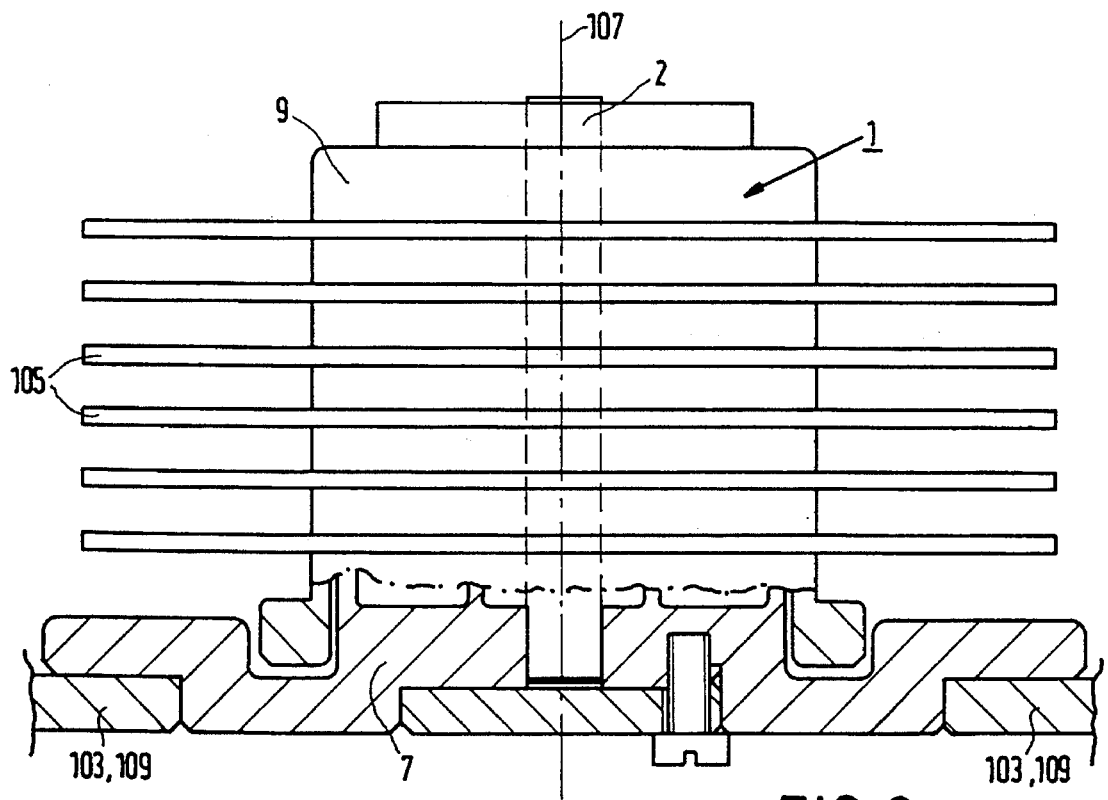
FIG. 8 is a side elevation of the data storage unit of FIG. 7.

FIGS. 7 and 8 diagrammatically show a data storage unit 101 with a housing 103 and a number of information discs 105 in parallel arrangement which are rotatable in the housing 103 about an axis of rotation 107. The information discs 105 are supported relative to the housing 103 in a direction parallel to the axis of rotation 107 and in a direction perpendicular to the axis of rotation 107 by means of one of the support devices 1 shown in FIGS. 1 to 6, depicted diagrammatically only in FIGS. 7 and 8. The base 7 of the support device 1 is for this purpose fastened to a bottom plate 109 of the housing 103, while the information discs 105 are provided with regular axial interspacings on the carder 9 of the support device 1. The data storage unit 101 is further provided with a scanning unit comprising a number of magnet heads 111 which are fastened on an arm 113 which is pivotable relative to the housing 103 and the information discs 105. The arm 113 comprises a separate magnet head 111 for each information disc 105. Only one of the magnet heads 111 is visible in FIG. 7, while the magnet heads 111 and the arms 113 have not been shown in FIG. 8 for the sake of simplicity. The information discs 105 are read or written by the magnet heads 111 in that the carrier 9 with the information discs 105 is rotated about the axis of rotation 107 by means of the support device 1 and the magnet heads 111 are positioned relative to the rotating information discs 105 by means of the arm 113.

The embodiments of the support device 1 shown in FIGS. 1 to 6 comprise an axial dynamic groove beating 13 with a first bearing part comprising an annular bearing disc 33 with groove patterns 41, 43 provided around the shaft 2 and a second beating part comprising an annular bearing disc 51 fastened to the locking piece 53. It is noted that a locking piece fastening according to the invention can also be applied in a support device which is provided with a beating of a different type, with a first bearing part and a second bearing part which must be accurately positioned relative to one another. The locking piece fastening can thus also be used, for example, in a support device known from European Patent 0 345 84 1 in which a rotatable and translatable compression piston is supported by a circular-cylindrical mandrel provided on a locking piece by means of a radial dynamic groove bearing. The locking-piece fastening according to the invention is applicable not only to support devices having a radial or axial dynamic groove bearing, but also, for example, to support devices having a radial or axial static fluid bearing or support devices having a sleeve bearing.

It is finally noted that the support device according to the invention is applicable not only to a data storage unit with rotatable information discs as mentioned above, but also to other devices such as, for example, a rotary read and write head for use in a magnetic tape device or a rotary mirror for use in a polygon scanner.

We claim:

1. A support device comprising a housing and a bearing surrounded by the housing, the bearing including a first bearing part present inside the housing and a second bearing part, a locking piece comprising the second bearing part and being fastened to the housing so as to cooperate with said first bearing part, the support device comprising an elastically deformable sealing element for preventing leakage of a fluid present between the two bearing parts along the locking piece, characterized in that the support device further includes a pressure member fastened to the housing, the sealing element is disposed between the locking piece comprising said second bearing part and the pressure member, the pressure member compresses the sealing member with pretension against the locking piece, and the locking piece bears on the housing by the pretension of the sealing element.

2. A support device as claimed in claim 1, characterized in that the housing includes a seat and the locking piece includes an adapter which bears on the seat of the housing, and the sealing element bears on the adapter and the second bearing part is situated at a distance from the sealing element, the adapter, and the seat.

3. A support device as claimed in claim 2, characterized in that the first bearing part is disposed on a shaft which is rotatably supported relative to the housing by the bearing, the locking piece and the shaft are concentrically arranged relative to an axis of rotation of the shaft, the adapter is an annular disc which extends along a circumference of the locking piece, and the sealing element and the pressure member are annular in shape and concentrically surround the locking piece.

4. A support device as claimed in claim 3, characterized in that the housing includes a flanged rim for fastening the pressure member to the housing.

5. A support device as claimed in claim 3, characterized in that the the adapter includes an annular first contact surface which extends perpendicularly to the axis of rotation, the housing includes a circular-cylindrical second contact surface near the seat on the housing and is concentric with the axis of rotation, the pressure member includes a third contact surface which extends conically relative to the axis of rotation, and the sealing element bears on the first, second, and third contact surfaces.

6. A support device as claimed in claim 5, characterized in that the second contact surface merges into the first contact surface near the seat via a curvature complementary to the sealing element.

7. A support device as claimed in claim 3, characterized in that the adaptor includes on an annular first contact surface extending perpendicularly to the axis of rotation, the housing includes an annular second contact surface near the seat and extending perpendicularly to the axis of rotation, the pressure member includes an annular third contact surface provided on the pressure member and extending perpendicularly to the axis of rotation, the contact surfaces of the adapter and of the housing merging into one another, and the sealing element bears on the first, second and third contact surfaces.

8. A support device as claimed in claim 7, characterized in that the pressure member is an elastically deformable annular disc which is provided near a circumference with the third contact surface which bears on the sealing element under the influence of a closing ring fastened to the housing under elastic deformation of the pressure member, which pressure member bears with a support ridge on the locking piece under the influence of a pretension of the pressure member derived from said elastic deformation.

9. A support device as claimed in claim 3, characterized in that the adaptor includes an annular first contact surface extending perpendicularly to the axis of rotation, the housing includes a second contact surface near the seat on the housing and extending conically relative to the axis of rotation, the pressure member includes a third contact surface extending conically relative to the axis of rotation, the second contact surface merging into the first contact surface near the seat via a curvature, the second and the third contact surface enclose an angle of substantially 60° seen in a plane through the axis of rotation, and the sealing element bears on the first, second and third contact surfaces.

10. A data storage unit for the accommodation of an information disc, which data storage unit is provided with a scanning unit for cooperating with the information disc and with a support device as claimed in claim 3 for the rotary support of the information disc, characterized in that the shaft of the support device is fixed relative to the housing, while the information disc is coupled to the housing of the support device.

11. A support device as claimed in claim 3, characterized in that the bearing is an axial dynamic groove bearing in which (i) the first bearing part is an annular bearing disc on the shaft and is provided with an annular bearing surface extending perpendicularly to the axis of rotation and having a pattern of grooves, and (ii) the second bearing part is an annular bearing disc comprised by to the locking piece and including a bearing surface extending perpendicularly to the axis of rotation so as to cooperate with the bearing surface of the first beating part.

12. A support device as claimed in claim 11, characterized in that the housing includes a flanged rim for fastening the pressure member to the housing.

13. A support device as claimed in claim 11, characterized in that the adapter includes an annular first contact surface which extends perpendicularly to the axis of rotation, the housing includes a circular-cylindrical second contact surface near the seat on the housing and concentric with the axis of rotation, the pressure member includes a third contact surface which and extends conically relative to the axis of rotation, and the sealing element bears on the first, second, and third contact surfaces.

14. A support device as claimed in claim 11, characterized in that the adaptor includes on an annular first contact surface extending perpendicularly to the axis of rotation, the housing includes an annular second contact surface near the seat and extending perpendicularly to the axis of rotation, the pressure member includes an annular third contact surface on the pressure member and extending perpendicularly to the axis of rotation, the contact surfaces of the adapter and of the housing merging into one another, and the sealing element bears on the first, second and third contact surfaces.

15. A support device as claimed in claim 11, characterized in that the adaptor includes on an annular first contact surface extending perpendicularly to the axis of rotation, the housing includes a second contact surface near the seat on the housing and extending conically relative to the axis of rotation, the pressure member includes a third contact surface extending conically relative to the axis of rotation, the second contact surface merges into the first contact surface near the seat via a curvature, the second and the third contact surface enclose an angle of substantially 60° seen in a plane through the axis of rotation, and the sealing element bears on the first, second and third contact surfaces.

16. A support device, comprising:

a shaft having an axis of rotation and a first bearing surface extending transverse to the axis of rotation;

a housing enclosing a portion of said shaft, said housing including a seat adjacent said shaft, and said housing and said shaft being rotatable relative to each other;

a locking piece comprising a second bearing surface for cooperating with said first bearing surface, said locking piece including a positioning surface in contact with said seat on said housing for positioning the second bearing surface relative to said first bearing surface, said seat and said positioning surface being spaced from said first and second bearing surfaces in a direction transverse to said axis of rotation;

a sealing element disposed against said locking piece for preventing leakage of a working fluid along said locking piece, said sealing element being generally axially aligned with said seat and said positioning surface; and means for axially biasing said sealing element with pretension against said locking piece, said pretension of said sealing element axially biasing said positioning surface against said seat of said housing, along an axial force transmission path transversely spaced from said first and second bearing surfaces, to position said second bearing surface relative to said first bearing surface.

17. A support device according to claim 16, wherein one of said first and second bearing surfaces includes a pattern of hydrodynamic bearing grooves.

18. A support device according to claim 16, wherein said first and second bearing surfaces extend perpendicular to the axis of rotation.

* * * * *